UNITED STATES PATENT OFFICE.

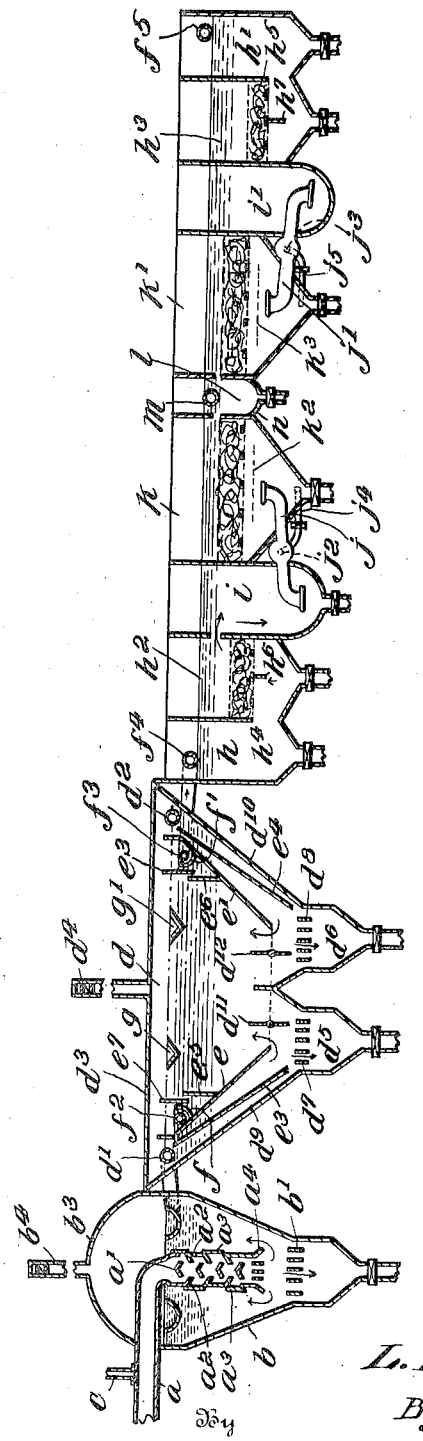

LUCIEN LINDEN, OF LONDON, ENGLAND, ASSIGNOR TO WILLIAM JOHN STEWART, OF LONDON, ENGLAND.

PROCESS FOR THE COMPLETE TREATMENT OF SEWAGE OR CONTAMINATED LIQUID.

1,307,686.  Specification of Letters Patent.  Patented June 24, 1919.

Application filed September 5, 1918. Serial No. 252,736.

*To all whom it may concern:*

Be it known that I, LUCIEN LINDEN, a subject of the King of Belgium, and residing at 46-49 Granville House, Arundel street, Strand, London, W. C. 2, England, have invented a certain new and useful Process for the Complete Treatment of Sewage or Contaminated Liquid, of which the following is a specification.

This invention relates to the complete treatment of sewage and other contaminated liquids.

In such processes as at present carried out the liquid is frequently obliged to remain completely or substantially stationary for long intervals of time in order that reactions or mechanical sedimentations may be effected. This practice, however, results in the actions being slow and imperfect, while the provision of apparatus of large capacity becomes necessary and considerable time is required to carry out the treatment.

Now I have found that by modifying the constructions and proportioning the various parts of the installation with a due regard to the functions of the remaining parts, the efficiency of each portion of a combined purifying plant may be greatly increased with a correspondingly enhanced capacity of output for the size of the apparatus. Furthermore, by performing the various functions of the process in different pieces of apparatus especially adapted to the particular ends in view the time required for each particular function may be considerably lessened, and as all the functions are proceeding simultaneously in the combined installation the actual time required for the complete treatment of a given quantity of liquid is comparatively short, so much so that for the daily purification of 1,000,000 gallons, the area covered by the plant need not exceed 500 square yards, while 100 minutes is sufficient for the passage of liquid through the complete installation. In this way it is possible to complete the treatment of sewage while it is in a comparatively fresh state and before substantial decomposition has occurred, thus rendering possible the recovery of valuable constituents which under ordinary conditions of working are wasted.

The principal object of the present invention is to provide means for dealing rapidly with large volumes of liquid in apparatus of comparatively small dimensions.

A further object of the invention is to provide for a quicker and more thorough separation of heavy impurities and those of a greasy nature which are lighter than the liquid.

The invention consists in a process for the complete treatment of sewage or contaminated liquid, in which the turbulent flow of the fresh sewage against a series of abruptly deflected surfaces effects the breaking up of the solid matter and preferably intimate admixture with a reagent, while a sudden reversal to ascending movement in the presence of suitable directing surfaces in a primary decanting vessel immediately transfers the heavier impurities from the moving liquid to a protected quiescent zone facilitating their frequent or continuous prompt removal, degreasing, clarification, sterilization, aeration and deodorization as required being successively performed by the combined actions occurring during the continuous and comparatively rapid passage of the liquid through the further units of a combined purifying plant.

The invention further includes a decanting tank of the type indicated, in which the liquid in the downwardly sloping conduit is divided into two streams of which the larger, containing the greater portion and the heaviest of the particles, is gradually accelerated on its way to the bottom of the tank where the particles immediately pass between screening surfaces into a quiescent zone, the other stream passing downward at a gradually decreasing speed which permits of further separation of the greasy particles which are lighter than, and tend to rise in, the liquid from those which on account of their specific gravity also fall between the screening surfaces.

The invention also consists in the improved processes and apparatus for the complete treatment of sewage or other liquids as hereinafter described.

The system comprises the preferably violent mechanical mixture of the sewage while in continuous progression in suitable decanting apparatus with one or more purifying or deodorizing agents, the almost immediate precipitation of the coarser part of the sludge after it has been broken up and agitated in the act of freeing the fatty substances therefrom, the prompt separation of the liquid from said sludge deposit and the precipitation of the latter by movement controlled by directing surfaces in a decanting basin, and the further immediate passage into a second separating tank where the material remaining in suspension is further eliminated by downward flow which in cooperation with gravity permits the separation of a further quantity of solid particles by deflecting surfaces followed by upward flow at gradually decreasing velocity to assist natural gravity sedimentation while fatty particles having a lower specific gravity rise to the surface. Finally, the water thus separated is then subjected to a further and more complete purifying treatment produced by deodorizing and sterilizing agents such as iron, during a rapid filtration and elimination of the purifying and deodorizing agents as well as any remaining undesirable ingredients of the sewage.

The subsequent operations are designed to effect the final purification and to produce water which is clean and imputrescible. For this purpose the water is passed through aeration chambers and aerating filters constructed in such a manner as to be capable of being cleaned rapidly and automatically by reversal of the flow of liquid therethrough in order to maintain a high standard of purity, the filter beds serving not only for clarifying the water but also for distributing throughout the mass air or other agents that are considered to be the best suited for purifying water, oxidizing it, deodorizing it and eliminating therefrom the agents that have been previously added to it or which were originally contained in the sewage.

In carrying the invention into effect in the apparatus shown by way of example in the accompanying diagrammatic drawing, the sewage or the like is conveyed by a conduit $a$ to a chamber $b$ having a cover $b^3$ provided with a ventilating shaft $b^4$.

In the conduit or pipe $a$ is a connection $c$ for adding to the sewage a reagent such as hypochlorite of lime.

The conduit $a$, after an abrupt turn, is directed downward in the center of the chamber $b$, the downwardly directed portion being of an increased cross-sectional area and provided with baffles or directing surfaces $a'$, $a^2$, which cause constant abrupt deflections of the liquid in its path downward, thus causing a constant agitation and disturbance of the liquid which effectually breaks up into small particles all the solid matter in suspension therein. Readily removable doors $a^3$ are provided upon the sides of this portion of the conduit to afford access for cleaning the directing surfaces and dislodging therefrom any deposit which may accumulate. At the bottom of the downwardly directed portion of the conduit are a further series of vertical directing surfaces $a^4$ for the purpose of imparting a vertical downward direction to the solid particles leaving the bottom of the conduit. The solid particles pass onward through a further series of directing surfaces $b'$ in the lower portion of the chamber $b$, while the liquid now freed from a considerable portion of the solid matter rises in the chamber and overflows into the collecting trough $b^2$. The solid matter or sludge collects in the restricted lower portion of the chamber $b$ below the surfaces $b'$ and is pumped or removed therefrom in any other convenient manner to a receptacle where it may be subjected to further treatment as desired.

The liquid overflowing into the trough $b^2$ passes therefrom by a suitable conduit and is conveyed by mains to the inlets $d'$, $d^2$, of the second depositing or settling tank $d$, which may be of the form hereinafter described or of other suitable kind as, for example, that described in my United States Patent No. 1024451.

The tank $d$, as shown in the drawing, has a cover $d^3$ provided with a ventilating shaft $d^4$ and its opposite ends at which the inlets are situated incline downward to restricted receptacles or pockets $d^5$, $d^6$, provided in the bottom of the tank. The pockets $d^5$, $d^6$ are protected from the disturbing action of the liquid moving in the tank by a series of directing surfaces $d^7$, $d^8$, and provision is made at the bottom of these pockets for removal of the sludge as in the case of the chamber $b$ hereinbefore described.

Substantially parallel with the inclined end surfaces $d^9$, $d^{10}$, are partitions $e$, $e'$, extending from just below the cover $d^3$ of the tank to just above the tops of the pockets $d^5$ $d^6$. These partitions provide a wide downwardly directed conduit at each end of the tank $d$ which conduits may be each further subdivided into two by the partitions $e^3$, $e^4$, so arranged that while the cross-sectional area of the two outer conduits decreases from the top to the bottom, the cross-sectional area of the two inner conduits increases in substantially the same proportion.

The inlets $d'$, $d^2$, enter immediately above the openings of the outer conduits, which, being at their tops of considerably greater width than the two inner conduits, consequently receive the greater portion and heaviest of the particles. The liquid entering at the inlets $d'$, $d^2$, flows down the two conduits formed by the partitions and the inclined ends of the tank, the lower or heavier portion of the streams of liquid passing down the lower conduits and having their speed gradually increased, while the upper or lighter portion of the liquid passes down the inner conduits with a consequent gradual decrease in its velocity. The particles, of which most are in the outer conduits, are carried down by the increasing velocity and delivered through the directing surfaces $d^7$ or $d^8$ into the quiescent zones existing in the pockets $d^5$, $d^6$, where their further disturbance is prevented, while a further quantity of particles will, due to the decreasing velocity, settle out of the liquid passing down the inner conduits and also fall through the directing surfaces into the collecting pockets. The liquid rising from the ends of the downwardly directed conduits and carrying with it the greasy particles which are of a less specific gravity than the liquid itself, passes through screens or grids $d^{11}$, $d^{12}$, placed horizontally between the ends of the partitions $e$ and $e'$ and the central division between the pockets $d^5$ and $d^6$. The screens $d^{11}$, $d^{12}$, are pivotally mounted about their central axis so that they may be conveniently swung into a vertical position for the purpose of reversing or cleaning them.

About the middle of the inclined partitions $e$ and $e'$ are situated vertical partitions $e^5$, $e^6$, rising to a short distance below the normal level of the liquid in the tank $d$, and situated a short distance upon the outer side of these vertical partitions are further vertical partitions $e^7$, $e^8$, the bottoms of which are somewhat below the tops of the partitions $e^5$, $e^6$, and the tops of which reach to within a short distance of the cover $d^3$ of the tank.

The vertical partitions or weirs $e^5$, $e^7$, $e^6$, $e^8$, form traps or seals at each end of the body of the tank $d$ and within these seals are situated collecting troughs $f$, $f'$, into which the liquid from the tank overflows and passes out through the outlets $f^2$, $f^3$. The seals thus formed, while allowing liquid of a certain density to leave the tank, trap the lighter material or fatty substances which are floating upon the surface of the liquid and when these have accumulated to a depth at which they may be liable to pass the seals they are removed through the collecting troughs $g$, $g'$, by momentarily closing the outlets $f^2$, $f^3$, and allowing the level of liquid in the tank to rise above the edges of the troughs. As soon as the whole or any desired portion of the fatty substances has been removed, the outlets $f^2$, $f^3$, are again opened and the liquid again sinks to the normal working level.

The operations which take place in the tank $d$ may be explained as follows:—

The pipe $d'$ is located directly above the wider passage, namely the passage between $d^9$ and $e^3$, and this passage tapers downwardly, so that the sewage in going downwardly through said passage will flow at a successively increasing rate of speed. The said passage is much wider at the top than the passage between $e$ and $e^3$, and also the first mentioned passage is located directly under the inlet pipe $d'$. Accordingly one part of the liquid will flow through the first mentioned passage, such part carrying the major part of the solids, especially the heavier solids, in the liquid sewage, due to the tendency of the solids to fall, by gravity, vertically. As the liquid after flowing through this first mentioned passage leaves the lower end thereof, a great amount of the heavy solids in the sewage will drop downwardly through the grating $d^7$.

The liquid flowing through the inclined passage between $e$ and $e^3$ will carry (in proportion to its volume) a much smaller percentage of solids than the liquid flowing through such first mentioned passage. This liquid must flow at a progressively slower speed in this second mentioned passage, since said passage flares in a downward direction, and on account of this flaring, and also on account of the slowing down of its speed, there is opportunity afforded for sedimentation, that is to say the solid material carried in the liquid flowing through this second mentioned passage tends to drop out of the liquid and eventually through the grating $d^7$. The liquids from both of these passages reunite and flow into the main receptacle, but do not carry a great deal of the solids, these having dropped below the screen, as above stated. During the slow upward flow in the central compartment, fats and the like rise to the surface of the liquid.

The water of the sewage issuing from the outlets $f^2$, $f^3$, has now been freed from the whole of the coarser and medium sized particles of solid matter and fatty substances, but it will still retain in suspension some of the lighter solid particles and any foreign liquids originally present or added in the form of reagents.

From the outlets $f^2$, $f^3$, the water passes by the inlets $f^4$, $f^5$, to one or both of the decanting tanks $h$, $h'$, which are in communication at their lower ends with chambers $h^2$, $h^3$, containing filtering beds $h^4$, $h^5$. The filtering beds are supported upon suitable perforated trays and beneath them and in the decanting tanks $h$, $h'$, are arranged pockets provided with sludge removal means for collecting and removing any further deposit of solid particles. Partitions $h^6$, $h^7$, are arranged beneath the center of the filtering beds to avoid any large accumulation of substantially still or stagnant liquid beneath the filters.

The material forming the filtering beds $h^4$, $h^5$, contains iron in a suitable form, preferably iron ore, and the action of the hypochlorite still in contact with the water is then combined with the action of the iron to complete the sterilization and deodorization.

From the chambers $h^2$, $h^3$, the liquid passes into further contact and decanting tanks $i$, $i'$, in passing through which a certain time is allowed for contact with the reagents and completing the reactions.

On reaching the bottoms of the contact tanks $i$, $i'$, the water passes into the downturned ends of connecting pipes $j$, $j'$, the further up-turned ends of which are situated in the final aerating filter chambers $k$, $k'$.

The connecting pipes $j$, $j'$, have a central portion of considerably increased cross-sectional area, and to this portion air or other gaseous fluid is delivered in suitable quantities by the pipes $j^2$, $j^3$. The connecting pipes $j$ and $j'$ are given an upward inclination toward the chambers $k$, $k'$, and the downturned inlet ends of the pipes act as seals to prevent the air or other gaseous medium escaping from the inlets.

The aerating filter chambers $k$, $k'$, are provided with beds of distributing and arresting material, preferably formed of pebbles, so that a large area providing a number of intersticial passages is provided for causing a thorough mixing of the air or other gaseous medium with the water which results in the evolution of gases which are collected on the filtering material and pass in bubbles to the surface of the liquid, thus causing agitation and more vigorous action on the part of the reagent. Between the pebble beds and outlet ends of the pipes $j$, $j'$, horizontal perforated grids $k^2$, $k^3$, or the like are inserted to afford further assistance in thoroughly mixing the air or other gaseous medium with the water. If desired, pipe connections as shown dotted at $j^4$ and $j^5$ may be provided for delivering a certain amount of air or the like into the bottom of the aerating filter chambers for further agitating the liquid therein. The filter chambers $k$ and $k'$ communicate with a central outlet chamber $l$ in which the main outlet $m$ for purified water is situated. The chamber $l$ is also provided with a drain-off connection $n$ and provision is also made in the bottoms of the chambers $i$, $i'$, $k$ and $k'$ for easily removing any solid matter which may accumulate in the restricted bottoms thereof.

The two sets of vessels $h$, $i$, $k$, and $h'$, $i'$, $k'$, with the outlet preferably in the center between two or more beds, may be used simultaneously or alternatively, and in the event of the filtering beds requiring cleaning a portion of the purified water which has passed through one set of chambers may be taken in the reverse direction through the other set and run to waste through the sludge removal means in the bottoms of the chambers $h$ or $h'$ in such a manner that the filtering materials are washed by the already purified water. Further, the chambers $i$ and $i'$, if desired, may be omitted and a suitable connecting pipe having an efficient dip seal to prevent the escape of the gaseous aerating medium may be provided to lead the water from the upper portions of the chambers $h^2$, $h^3$, to the lower portions of the chambers $k$, $k'$.

Instead of inserting a reagent when required by means of the pipe $c$, it may be inserted after the coarser particles have been removed.

The purifying system hereinbefore described may advantageously be used for purifying water intended for domestic consumption or for industrial purposes.

Having now described my invention, what I claim as new and desire to secure by Letters Patent is:—

1. A method of rapidly treating sewage and other contaminated liquids consisting in breaking up any contained solid by turbulence created in the flowing liquid, eliminating the heavier particles by throwing them beyond a protective screen of baffles, dividing the current into two streams, of which the one containing the greater mass of remaining particles is accelerated downward, while the other is retarded, reuniting said streams and causing the combined stream to flow slowly upwardly; separately drawing off the particles of lower specific gravity than the sewage after such material has risen to the surface of the liquid and filtering the liquid to remove the remaining impurities.

2. A systematic complete treatment of sewage or other contaminated liquid, which comprises successively the following steps; first, the turbulent flow of the fresh sewage against several abruptly deflected surfaces, relative to the direction of the flow of the liquid, to break up the solid matter and to mix the sewage, second, subjecting the mixed material, in a plurality of separated streams to flow in a downward direction, one stream containing the larger and heavier part of the solid matter being caused to flow at a constantly increasing speed while another portion of the sewage containing relatively less solid matter is caused to flow at a constantly decreasing speed, whereby a considerable part of the heavy solid matter in the liquid leaves the liquid, third, causing such solid matter to collect in a screened-off relatively quiescent portion of the sewage under treatment, while causing the liquid to rise slowly, whereby particles of material of lower specific gravity than the sewage are caused to rise to the surface, fourth, separating from the sewage the heavy particles above referred to and the light material above referred to, fifth, drawing off the remaining liquid and filtering the same through a purifying agent, sixth, aerating the remaining liquid and filtering the same, whereby substantially pure water results.

3. In the treatment of sewage and similar material, the herein described process which comprises, first, thoroughly mixing the sewage with a chemical purifying agent, thereafter separating the sewage into two portions, and causing the one of these portions to flow downwardly at a constantly increasing rate of speed, while causing another portion carrying proportionately less solid matter to flow downwardly at constantly decreasing speed, said two portions being kept separate from each other during said action, then reuniting the two streams and causing the same to rise at a speed slower that the speed of flow in the preceding operation, whereby at about the end of the downward movement, a large proportion of heavy solids is removed from the sewage and whereby during the upward movement a large proportion of the material of lower specific gravity than the sewage is caused to rise to the surface of the sewage.

4. In the treatment of sewage the herein described process which comprises the steps of dividing the sewage into two fractions, the one of which contains a proportionately greater percentage of heavy solids than the other, causing such first mentioned fraction to flow in a downward direction at a constantly increasing speed, while causing the smaller of said fractions to flow downwardly at a constantly decreasing speed, then reuniting the said two streams and allowing the fatty material contained in the sewage to rise to the surface thereof.

5. A process which comprises thoroughly mingling a chloridizing reagent with the sewage, separating at least the major portion of the impurities heavier than the sewage and the impurities lighter than the sewage, such operations being conducted in the dark, thereafter subjecting the sewage to filtration through iron ore, and finally aerating and filtering the sewage.

6. An apparatus suitable for the complete treatment of sewage comprising a sewage inlet, a baffle conduit through which the sewage is caused to flow, a sedimentation tank having a plurality of downwardly extending passages separated through their entire length, at least one of which tapers downwardly, and at least one other of which increases in size downwardly, and having an upwardly extending flaring large passage communicating at its lower end with said downwardly extending passages, an up-flow filter suitable for containing a mass of iron ore, another up-flow filter with an air inlet below the same, and connections connecting said elements in the order mentioned, the conduit from the baffled conduit to the sedimentation tank terminating above the said downwardly tapering passage.

7. An apparatus suitable for the complete treatment of sewage comprising a baffled conduit through which the sewage is caused to flow, a sedimentation tank having a plurality of downwardly extending passages separated throughout their entire length, at least one of which tapers downwardly, and at least one other of which increases in size downwardly, and having a large chamber communicating with the lower ends of said downwardly extending passages, a sewage inlet from said baffled conduit located over said tapering passage, a screen of substantially vertical plates located in said sedimentation tank below the junction of said downwardly extending passages with said chamber and a sludge outlet below said screen.

8. An apparatus suitable for the complete treatment of sewage comprising a baffled conduit through which the sewage is caused to flow, a sedimentation tank having a plurality of downwardly extending passages, at least one of which tapers downwardly, and at least one other of which increases in size downwardly, and a sewage inlet above said tapering passage, such tank also having a large passage communicating with the lower ends with said downwardly extending passages, weirs located in the upper part of said upwardly extending passage for preventing the fatty material carried upon the top of the liquid therein from flowing away with said liquid, a trap into which the sewage flows from said upwardly extending passage, and a sewage outlet from said trap, an up-flow filter containing a mass of iron ore, another up-flow filter with an air inlet below the same, and connections connecting said elements in the order mentioned.

9. In an apparatus for the treatment of sewage, the combination of a tank narrower at the bottom than at the top, a baffle arranged therein, of which the lower end is nearer to the wall of said tank than is the upper end, forming a passage tapering downward, another baffle spaced from said first mentioned baffle, of which the upper end is nearer to said first mentioned baffle than is the lower end, forming a second passage flaring downward, both of said baffles extending from just below the liquid level in the tank to near the lower end of said tank, a sewage inlet located in said tank directly above the first mentioned passage, a screen dividing the tank into upper and lower compartments at a level slightly below the lower end of said tapering passage, and an upwardly extending flaring compartment in said tank communicating at its lower end with said two passages.

10. In an apparatus for the treatment of sewage, the combination of a tank narrower at the bottom than at the top, a baffle arranged therein, of which the lower end is nearer to the wall of said tank than is the upper end, forming a passage tapering downward, another baffle spaced from said first mentioned baffle, of which the upper end is nearer to said first mentioned baffle than is the lower end, forming a second passage flaring downward, both of said baffles extending from just below the liquid level in the tank to near the lower end of said tank, a sewage inlet located above the said downwardly tapering passage, a screen dividing the tank into upper and lower compartments at a level slightly below the lower end of said tapering passage, and an upwardly extending relatively large compartment in said tank communicating at its lower end with said two passages, a weir in the upper part of said compartment for allowing liquid sewage to flow to a sewage outlet but to prevent grease floating thereupon from flowing therewith, and a separate grease outlet from said compartment.

11. In the purification of sewage, the herein described improvement which comprises passing the sewage in a downward direction, as two separated currents, one of which containing a relatively large portion of the solids, flows with a constantly increasing velocity, and the other of which, containing only a relatively small fraction of the solids flows with a constantly decreasing velocity, whereby when the said two currents reunite a considerable proportion of the solids carried by said first mentioned current are caused to separate therefrom, causing such separated solids to drop into a relatively quiescent body of liquid to remain separated from the flowing liquid, and causing the liquid body produced by reuniting such two currents to flow slowly as a relatively large body so that grease in the sewage can rise to the surface thereof.

12. In the purification of sewage, the herein described improvement which comprises passing the sewage in a downward direction, as two separated currents, one of which flows with a constantly increasing velocity, and the other of which flows with a constantly decreasing velocity, keeping said two currents separate from each other, thereby allowing a considerable proportion of the solid matters to separate from the sewage, causing such solid matter to fall into a screened-off relatively quiescent body of liquid to remain separated from the liquid, reuniting said two currents, causing the liquid to slowly rise, so that grease in the sewage can rise to the surface thereof, and separately drawing off grease and the partially purified sewage.

In testimony whereof I have signed my name to this specification.

LUCIEN LINDEN.